United States Patent
Nagao et al.

(10) Patent No.: US 7,455,210 B2
(45) Date of Patent: Nov. 25, 2008

(54) PROCESSING OPERATION CONTROL METHOD, PROCESSING OPERATION CONTROLLER, COMPUTER PROGRAM FOR CARRYING OUT THE METHOD, INFORMATION STORAGE MEDIUM STORING THE COMPUTER PROGRAM

(75) Inventors: Yasuhide Nagao, Kobe (JP); Hajime Kashiki, Kobe (JP); Kotoyoshi Murakami, Hiroshima (JP)

(73) Assignee: Kawasaki Jukogyo Kabushiki Kaishi, Kobe (JP)

( * ) Notice: Subject to any disclaimer, the term of this patent is extended or adjusted under 35 U.S.C. 154(b) by 142 days.

(21) Appl. No.: 10/472,034

(22) PCT Filed: Mar. 29, 2002

(86) PCT No.: PCT/JP02/03208

§ 371 (c)(1),
(2), (4) Date: Sep. 17, 2003

(87) PCT Pub. No.: WO02/078894

PCT Pub. Date: Oct. 10, 2002

(65) Prior Publication Data

US 2004/0112939 A1 Jun. 17, 2004

(30) Foreign Application Priority Data

Mar. 29, 2001 (JP) .............................. 2001-097201

(51) Int. Cl.
*B23K 31/02* (2006.01)
(52) U.S. Cl. .................... 228/112.1; 228/2.1; 700/212; 700/147
(58) Field of Classification Search .............. 228/112.1, 228/2.1; 700/147, 212; 156/73.5
See application file for complete search history.

(56) References Cited

U.S. PATENT DOCUMENTS 5,460,317 A  *  10/1995  Thomas et al. ............ 228/112.1

(Continued)

FOREIGN PATENT DOCUMENTS

EP    WO 00/02704    1/2000

(Continued)

OTHER PUBLICATIONS

European Search Report.

*Primary Examiner*—Kevin P Kerns
(74) *Attorney, Agent, or Firm*—Oliff & Berridge, PLC

(57) ABSTRACT

A processing operation control method controls a processing operation in which a rotary tool 1 is rotated by a rotative drive unit 51, and presses the rotating rotary tool 1 is pressed by a pressing unit 52 to force the rotating rotary tool 1 into workpieces W1 and W2. Load placed on the rotary tool 1 during the processing operation is measured, an optimum rotating speed at which the rotary tool 1 is to be rotated and/or an optimum pressure to be applied to the rotary tool 1 for processing the workpieces W1 and W2 is determined on the basis of the measured load placed on the rotary tool 1. The rotative drive unit 51 and/or the pressing unit 52 are controlled on the basis of the optimum rotating speed at which the rotary tool 1 is to be rotated and/or the optimum pressure to be applied to the rotary tool 1.

10 Claims, 5 Drawing Sheets

U.S. PATENT DOCUMENTS

| | | | |
|---|---|---|---|
| 6,050,475 A * | 4/2000 | Kinton et al. | 228/112.1 |
| 6,299,050 B1 * | 10/2001 | Okamura et al. | 228/110.1 |
| 6,325,273 B1 * | 12/2001 | Boon et al. | 228/112.1 |
| 6,421,578 B1 * | 7/2002 | Adams et al. | 700/212 |
| 6,497,355 B1 * | 12/2002 | Ding et al. | 228/2.1 |
| 6,499,649 B2 * | 12/2002 | Sayama et al. | 228/112.1 |

FOREIGN PATENT DOCUMENTS

| | | |
|---|---|---|
| JP | B2 2712838 | 10/1997 |
| JP | A 10-183316 | 7/1998 |
| JP | 11-047958 | 2/1999 |
| JP | A 11-226758 | 8/1999 |
| JP | 2000-015457 | 1/2000 |
| JP | 2000-028955 | 1/2000 |
| JP | A 2000-15426 | 1/2000 |
| JP | 2000-141057 | 5/2000 |
| JP | A 2000-135577 | 5/2000 |
| JP | 2001-025884 | 1/2001 |
| JP | A 2001-198683 | 7/2001 |

* cited by examiner

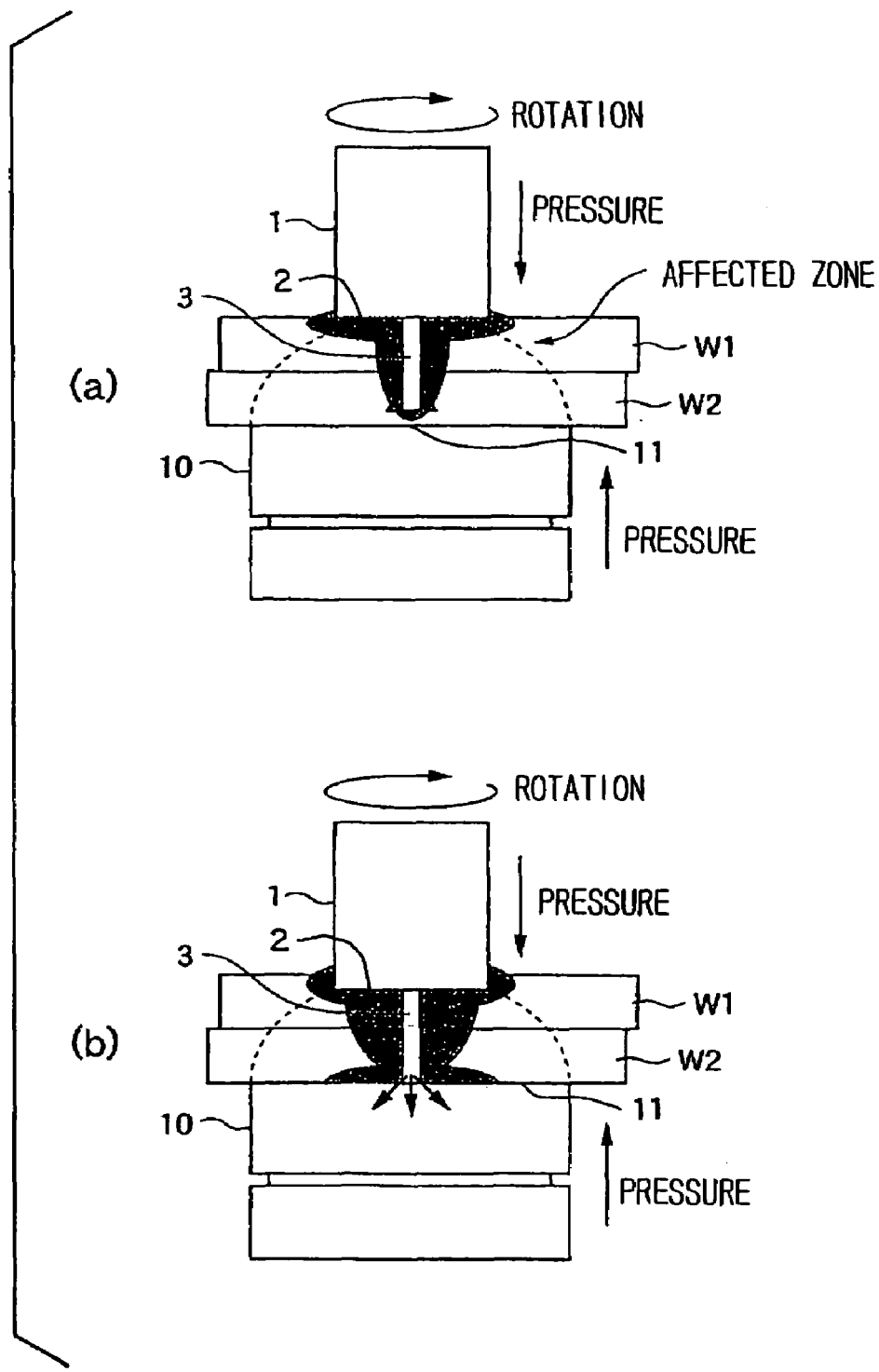
F I G. 1

PROCESSING OPERATION CONTROL METHOD, PROCESSING OPERATION CONTROLLER, COMPUTER PROGRAM FOR CARRYING OUT THE METHOD, INFORMATION STORAGE MEDIUM STORING THE COMPUTER PROGRAM

TECHNICAL FIELD

The present invention relates to a processing operation control method of controlling a processing operation for bonding together metallic workpieces, such as castings, plates or such, by frictional melting and stirring, a processing operation controller, a computer program for carrying out the method, and a storage medium storing the computer program.

BACKGROUND ART

Conventional bonding techniques put plates or three-dimensional pressed metallic workpieces on top of each other and bond the metallic workpieces together by electric resistance welding, arc welding, adhesive bonding using an adhesive, or mechanical fastening using bolts or rivets.

When the metallic workpieces have three-dimensional shapes, spot welding capable of locally bonding a plurality of joining parts is used.

A bonding method disclosed in Jpn. Pat. No. 2712838 is another technique that uses friction stir bonding in a nonfused state. This bonding technique drives a rotating projection called a probe into the joint of the adjoining surfaces of two workpieces to bond together the adjoining parts by plasticizing their metallographical structures by frictional heat.

Surface treatment methods of a casting, such as a joining surface to be bonded to the cylinder block of a cylinder head, disclosed in JP-A Nos. 183316/1998 and 15426/2000 rotates a rotating tool having a shoulder and a projection projecting from the shoulder, and presses the rotating tool against the surface to heat the surface in a nonfused state and to stir the nonfused surface of the casting.

Joining parts are bonded incompletely or melt if the rotating speed of the tool is excessively high, the depth of feed of the tool is excessively great or the tool is fed at an excessively high feed rate in bonding the joining parts by friction stir bonding in the nonfused state. Therefore, there is a limit to the reduction of processing time.

The aforesaid known bonding technique determines through experiments beforehand the control parameters, including an optimum rotating speed of the tool suitable for the thickness and materials of workpieces to be bonded together and the depth of feed of the tool. Therefore, experiments must be conducted again to determine optimum control parameters when the design of the workpieces is changed or different workpieces are bonded together. A test process is necessary for the evaluation of quality, such as bond strength, and a sample obtained by actually bonding workpieces together must be subjected to a tensile test or the like.

DISCLOSURE OF THE INVENTION

The present invention has been made in view of the foregoing problems and it is therefore an object of the present invention to provide a control method of controlling a processing operation using friction and stirring, capable of controlling the condition of workpieces being processed and of stabilizing a bonded state, a processing operation controller, a computer program for carrying our the method, and a storage medium storing the computer program.

According to the present invention, a processing operation control method of controlling a processing operation in which a rotary tool is rotated by a rotative drive unit, and the rotating rotary tool is pressed by a pressing unit to force the rotating rotary tool into a workpiece to process the workpiece comprises the steps of: measuring load placed on the rotary tool during the processing operation; determining an optimum rotating speed at which the rotary tool is to be rotated or an optimum pressure to be applied to the rotary tool, and/or both for processing the workpiece on the basis of the measured load placed on the rotary tool; and controlling the rotative drive unit and/or the pressing unit on the basis of the optimum rotating speed at which the rotary tool is to be rotated and/or the optimum pressure to be applied to the rotary tool.

In the processing operation control method according to the present invention, the rotative drive unit is a rotative drivemotor, and the load placed on the rotary tool is determined on the basis of a current of the rotative drive motor.

In the processing operation control method according to the present invention, the optimum rotating speed at which the rotary tool is to be rotated and/or an optimum pressure to be applied to the rotary tool for processing the workpiece, are determined on the basis of the depth of feed of the rotary tool in addition to the load placed on the rotary tool.

In the processing operation control method according to the present invention, the pressing unit is a pressing motor, and the depth of feed of the rotary tool is determined on the basis of a value indicating information about the pressing motor measured by an encoder.

In the processing operation control method according to the present invention, an optimum processing time for which the rotary tool is to be operated for processing the workpiece is determined on the basis of the measured load placed on the rotary tool, and the rotative drive unit and/or the pressing unit, are controlled according to the optimum processing time.

In the processing operation control method according to the present invention, the optimum rotating speed at which the rotary tool is to be rotated and/or the optimum pressure to be applied to the rotary tool for processing the workpiece, are determined on the basis of the measured load placed on the rotary tool, using a database containing empirical data and produced beforehand through experiments.

According to the present invention, a processing operation controller for controlling a processing operation in which a rotary tool is rotated by a rotative drive unit, and the rotating rotary tool is pressed by a pressing unit to force the rotating rotary tool into a workpiece to process the workpiece comprises: a load measuring means for measuring load placed on the rotary tool during the processing operation; a speed/pressure determining means for determining an optimum rotating speed at which the rotary tool is to be rotated and/or an optimum pressure to be applied to the rotary tool for processing the workpieces on the basis of the load measured by the load measuring means; and a control means for controlling the rotative drive unit and/or the pressing unit, on the basis of the optimum rotating speed at which the rotary tool is to be rotated and/or the optimum pressure to be applied to the rotary tool.

According to the present invention, a computer program controls a computer to accomplish a processing operation control method, of controlling a processing operation in which a rotary tool is rotated by a rotative drive unit, and the rotating rotary tool is pressed by a pressing unit to force the rotating rotary tool into a workpiece to process the workpiece, comprising the steps of: measuring load placed on the rotary tool during the processing operation; determining an optimum rotating speed at which the rotary tool is to be rotated and/or an optimum pressure to be applied to the rotary tool for processing the workpieces on the basis of the measured load placed on the rotary tool; and controlling the rotative drive unit and/or the pressing unit on the basis of the optimum rotating speed at which the rotary tool is to be rotated and/or the optimum stores to be applied to the rotary tool.

According to the present invention, an information storage medium stores a program code for controlling a computer to accomplish a processing operation control method of controlling a processing operation in which a rotary tool is rotated by a rotative drive unit, and the rotating rotary tool is pressed by a pressing unit to force the rotating rotary tool into a workpiece to process the workpiece, comprising the steps of: measuring load placed on the rotary tool during the processing operation; determining an optimum rotating speed at which the rotary tool is to be rotated and/or an optimum pressure to be applied to the rotary tool for processing the workpiece on the basis of the measured load placed on the rotary tool; and controlling the rotative drive unit and/or the pressing unit on the basis of the optimum rotating speed at which the rotary tool is to be rotated and/or the optimum pressure to be applied to the rotary tool.

According to the present invention, the load placed on the rotary tool is measured during the processing operation for processing the workpiece by frictionally stirring the workpiece by the rotating rotary tool, the optimum rotating speed at which the rotary tool is to be rotated and/or the optimum pressure to be applied to the rotary tool are calculated on the basis of the measured load, and the operation of the rotary tool is controlled on the basis of the optimum rotating speed at which the rotary tool is to be rotated and/or the optimum pressure to be applied to the rotary tool. Thus, the processing conditions for processing the workpiece can be controlled and the condition of bond can be stabilized.

According to the present invention, the load is calculated by using a current of the motor for driving the rotary tool for rotation, and the depth of feed of the rotary tool is calculated by using the output of the encoder indicating information about the pressing motor for vertically moving the rotary tool relative to the workpiece.

According to the present invention, the information storage medium stores the computer program for controlling the computer to carry out the processing operation control method in which the rotary tool is rotated and the workpiece is processed by frictionally stirring the workpiece, a load placed on the rotary tool is measured during the processing operation an optimum rotating speed at which the rotary tool is to be rotated and/or an optimum pressure to be applied to the rotary tool are calculated by using the measured load placed on the rotary tool, and the operation of the rotary tool is controlled on the basis of the optimum rotating speed and/or the optimum pressure. The computer program code is supplied to the computer. The computer reads the program code from the information storage medium and carries out the processing operation control method to provide the same effect as the method, and the method can be used for various purposes.

BRIEF DESCRIPTION OF THE DRAWINGS

FIGS. 1(a) and 1(b) are typical views of assistance in explaining a bonding method according to the present invention for bonding workpieces together by frictional stirring;

BEST MODE FOR CARRYING OUT THE INVENTION

Figure 2:
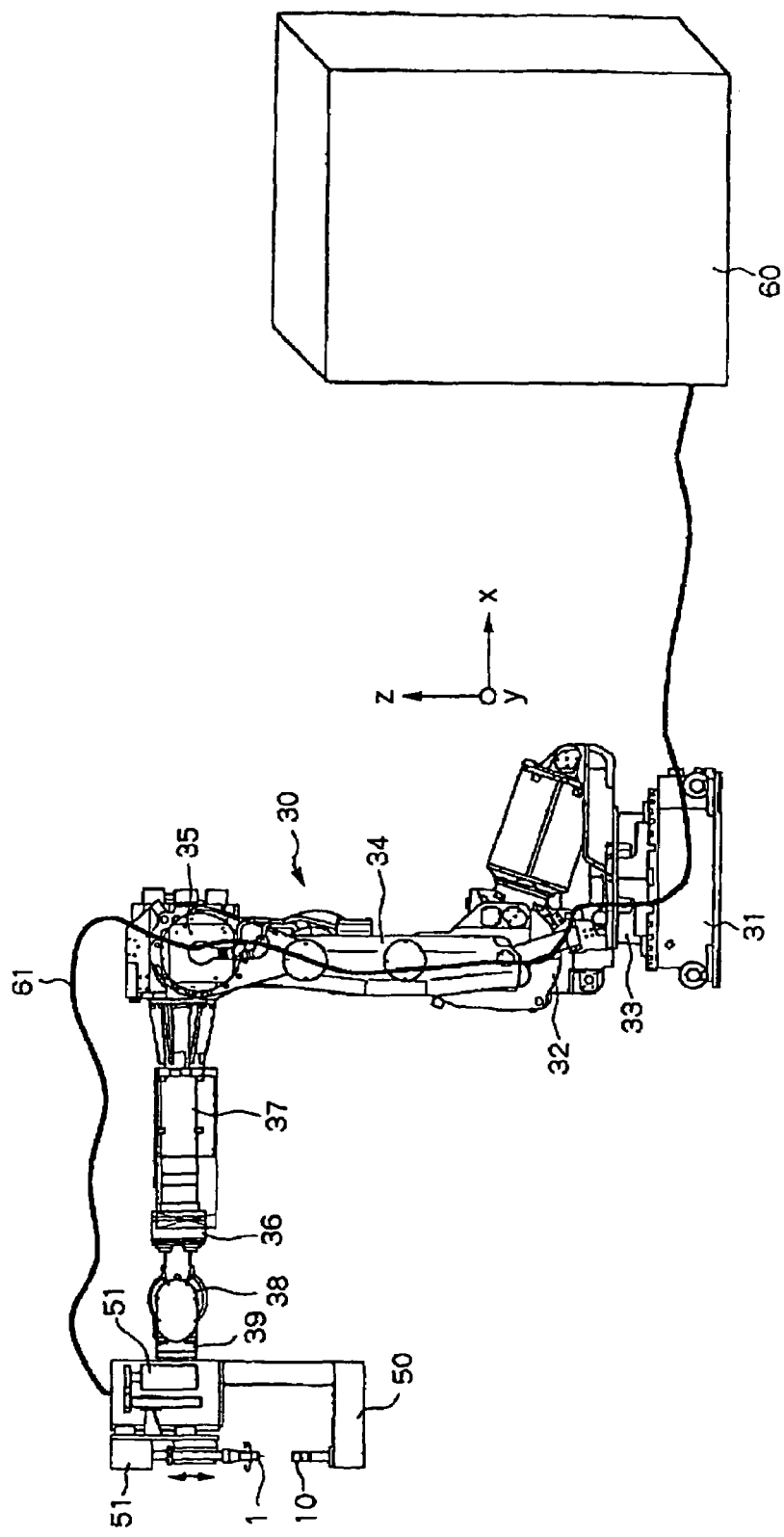
FIG. 2 is a schematic view of an articulated robot that fixes and drives a rotary tool.

Preferred embodiments of the present invention will be described with reference to the accompanying drawings.

Preferred embodiments that will be described hereinafter are examples only and various modifications and changes are possible therein without departing from the scope of the present invention.

Bonding Method Using Frictional Stirring

FIGS. 1(a) and 1(b) are typical views of assistance in explaining a bonding method using frictional stirring in a preferred embodiment according to the present invention.

Referring to FIGS. 1(a) and 1(b), the bonding method in the preferred embodiment is applied to bond together flat workpieces of aluminum alloys or the like. According to the bonding method at least two superposed workpieces, i.e., a first workpiece W1 and a second workpiece W2, are bonded together by pressing a rotating rotary tool 1 into the first workpiece W1 so that parts of the first workpiece W1 and the second workpiece W2 are fused by frictional heat and stirred by the rotating rotary tool 1, and the workpieces W1 and W2 are bonded together.

A stationary tool 10 is disposed so as to hold the first workpiece W1 and the second workpiece W2 between the rotary tool 1 and the stationary tool 10.

The rotary tool 1 is an abrasion-resistant tool formed of a steel (or a cemented carbide) having a hardness higher than those of the workpieces W1 and W2. The materials of the workpieces W1 and W2 are not limited to aluminum alloys provided that the materials are softer than the material of the rotary tool 1. The stationary tool 10 is formed of, for example, a steel or copper.

More specifically, the rotary tool 1 has a first shoulder 2, and a projection 3 projecting from the first shoulder 2. The workpieces W1 and W2 are held between the rotary tool 1 and the stationary tool 10, the rotary tool 1 is rotated at a predetermined rotating speed, and the projection 3 is pressed by a predetermined pressure against the first workpiece W1 to force the projection 3 into the workpieces W1 and W2. Consequently, the structures of parts of the workpieces W1 and W2 around the projection 3 are caused to make plastic flow. The volume of the structures of the parts of the workpieces W1 and W2 caused to make plastic flow has been increased. When the rotating rotary tool 1 is retracted, the structures of the parts caused to make plastic flow are cooled and there by the workpieces W1 and W2 are bonded together.

The bonding method in this embodiment is suitable for forming lap joints in automotive parts of three-dimensional sheets formed by shaping steel sheets, such as the outer panel and the reinforcement of a rear door, by local bonding. A plurality of scattered joining spots of workpieces, which cannot be bonded by continuously moving the rotary tool 1, formed in complicated three-dimensional shapes by press work can be bonded together by the bonding method in this embodiment. Thus, the bonding method is capable of bonding together workpieces formed by press working.

This bonding method does not need welding power, cooling water and air, which are used by conventional spot welding, and reduces energy consumption necessary for bonding remarkably. Since devices and equipment for producing the aforesaid energy are unnecessary, capital investment can greatly be reduced.

The bonding method can be carried out by a welding gun used for conventional spot welding and is not affected by restrictions on workpieces to be bonded together. The bonding method is not inferior to conventional spot welding in the strength of bonded parts and production efficiency.

FIG. 2 is a schematic view of an articulated robot 30 that holds and rotates the rotary tool 1. Referring to FIG. 2, the articulated robot 30 includes a base 31, a first arm 34 supported on the base 31 by a joint 32 for turning about ay-axis and supported on a joint 33 for turning about a z-axis, a second arm 37 connected to the first arm 34 by a joint 35 for turning about the y-axis and supported on a joint 36 for turning about an x-axis, and a third arm 39 connected to the second arm 37 by a joint 38 for turning about the y-axis.

A bonding gun 50 is attached to the free end of the third arm 39. The bonding gun 50 holds the rotary tool 1 for rotation, a rotative drive motor 51 for driving the rotary tool 1 for rotation, and the stationary tool 10. The stationary tool 10 is held opposite to the rotating tool 1. The distance between the rotary tool 1 and the stationary tool 10 is varied by a feed motor 52. Pressure to be applied to workpieces and the rotating speed of the rotary tool 1 are controlled for bonding. The bonding gun 50 can be applied to bonding together three or more superposed workpieces.

The operations of the arms of the articulated robot 30, the motor and the actuator are controlled by a robot controller 60 connected to the articulated robot 30 by a power-and-signal cable 61.

Figure 3:
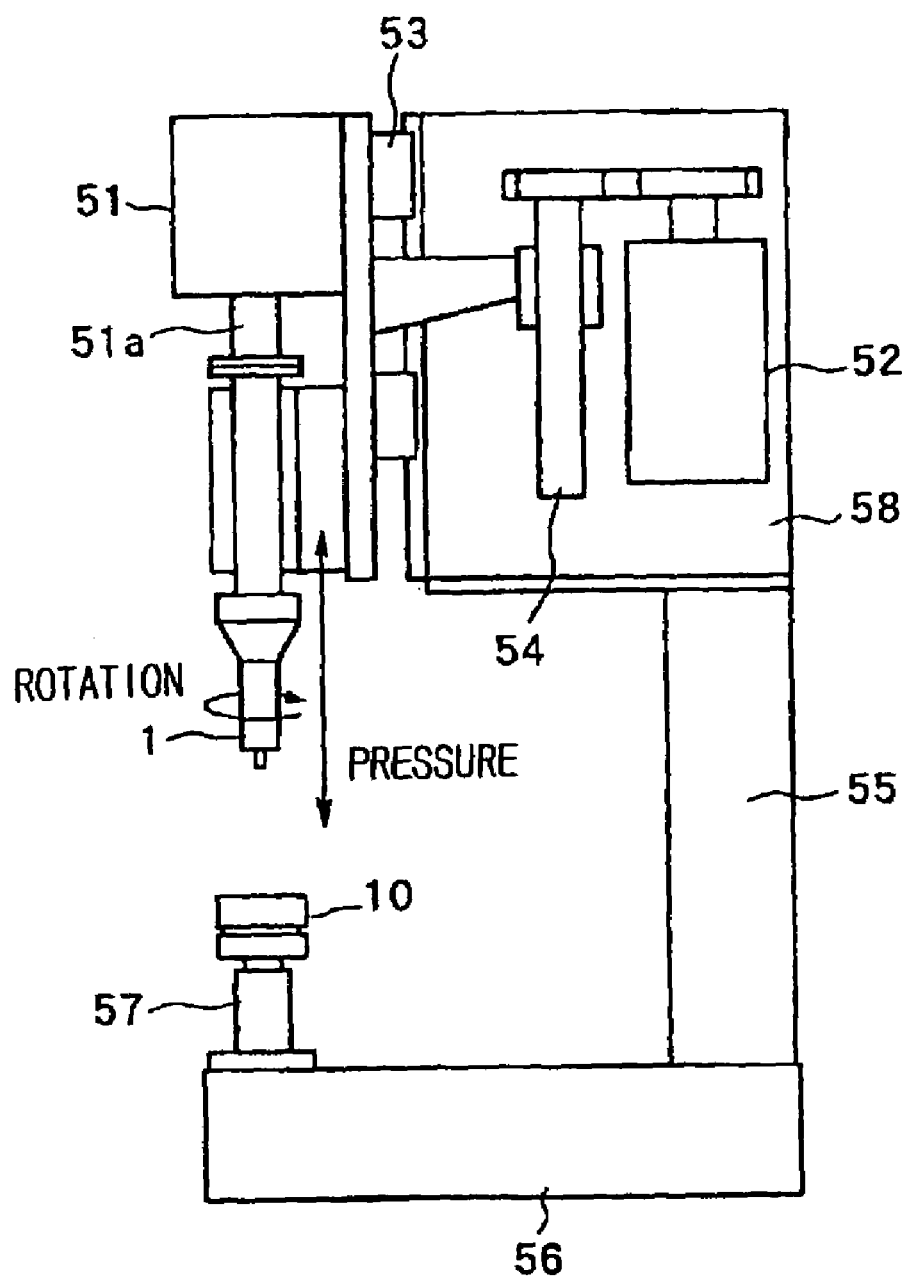
FIG. 3 is a side elevation of a bonding gun shown in FIG. 2.

FIG. 3 shows the bonding gun 50 shown in FIG. 2 more specifically.

As shown in FIG. 3, the bonding gun 50 has a vertical arm 55, and a lateral arm 56 attached to the lower end of the vertical arm 55. The stationary tool 10 is held by a bracket 57 on the lateral arm 56.

A drive unit 58 for rotating and vertically moving the rotary tool 1 is attached to the upper end of the vertical arm 55. The drive unit 58 has a base 53 capable of being vertically moved through a ball screw mechanism 54 by the feed motor 52. The rotative drive motor 51 for driving the rotary tool 1 is fixedly mounted on the base 53. A tool holder holding the rotary tool 1 is attached to the drive shaft 51a of the rotative drive motor 51. The rotary tool 1 and the stationary tool 10 are disposed axially opposite to each other.

The base 53 is moved vertically through the ball screw mechanism 54 by the feed motor 52 to move the rotary tool 1. The rotative drive motor 51 drives the rotary tool 1 for rotation.

Bonding Control Method

A bonding control method in a preferred embodiment according to the present invention will be described.

FIG. 4(a) is a flow chart of assistance in explaining the bonding control method in the preferred embodiment of controlling frictional stirring bonding.

Referring to FIGS. 4(a), 4(b) and 4(c), bonding conditions are calculated in step S1 by using a database containing empirical data on bonding conditions including the rotating speed of the rotary tool, pressure to be applied to the rotary tool and bonding time according to the materials and thicknesses of workpieces to be bonded together.

In step S3, an operation for rotating the rotary tool 1 is started.

A query is made in step S5 to see if the rotary tool 1 is rotating at a set rotating speed. If the response in step S5 is affirmative, the rotary tool 1 is lowered to start an operation for pressing the rotary tool 1 against the workpieces W1 and W2 in step S7. The rotating speed of the rotary tool 1 is calculated by using the output signal of an encoder combined with the rotative drive motor 51. The pressure is calculated by using a current fed back from the feed motor (pressing unit) 52. The distance between the rotary tool 1 and the stationary tool 10 is calculated by using a gun arm deflection correction table including empirical data determined beforehand, and the output signal of an encoder combined with the feed motor 52.

When it is decided in step S9 that the pressure applied to the rotary tool 1 has reached a predetermined pressure, and the projection 3 of the rotary tool 1 has been pressed into the workpieces W1 and W2, the rotary tool 1 is rotated with its shoulder 2 in contact with the first workpiece W1 to generate heat.

The position of the tip of the projection 3 of the rotary tool 1 pressed into the workpieces W1 and W2 is calculated by a feed calculating device 60b in step S11, and load placed on the rotary tool 1 is calculated by a load calculating device 60a in step S13.

The position of the tip of the projection 3 of the rotary tool 1 (feed) is calculated on the basis of the distance between the rotary tool 1 and the stationary tool 10. The load placed on the rotary tool 1 is calculated by using a current fed back from the rotative drive motor 51.

An optimum condition calculating device 60c calculates an optimum rotating speed, an optimum working pressure and an optimum processing time (optimum bonding time) in step S15 on the basis of the load placed on the rotary tool 1 calculated by the load calculating device 60a and the feed calculated by the feed calculating device 60b. For example, the optimum condition calculating device 60c determines optimum bonding conditions by calculating a thickness reduction in the upper workpiece monitoring the distance between the rotary tool 1 and the stationary tool 10, correcting or changing the bonding conditions (the pressure and the rotating speed) to prevent causing faulty bonding (bond strength reduction) due to the reduction of the thickness. The optimum bonding conditions are determined by correcting or changing the bonding conditions (the pressure and the rotating speed) so that the bonding conditions correspond to the tip of the projection 3 of the rotary tool 1 at the position calculated in step S13.

In step S17, a motor control device 60d for controlling the rotative drive motor and the feed motor holds bonding processes in steps S13 to S17 under the corrected (changed) optimum bonding conditions determined in step S15 for the bonding time determined in step S1 or the optimum bonding time determined instep S15. The bonding process is completed after the elapse of the bonding time.

The calculating devices 60a, 60b and 60c and the control device 60d are included in the robot controller (pressure controller) 60.

A table showing the relation between pressure acting on the tip of the projection 3 of the rotary tool 1 and current corresponding to the pressure and to be supplied to the feed motor 52 is prepared beforehand, and the pressure is controlled by calculating a pressure correcting expression using the table. Pressure can be calculated using the pressure correcting expression and a current fed back from the feed motor 52 when the pressure is applied to the rotary tool 1.

Figure 5:
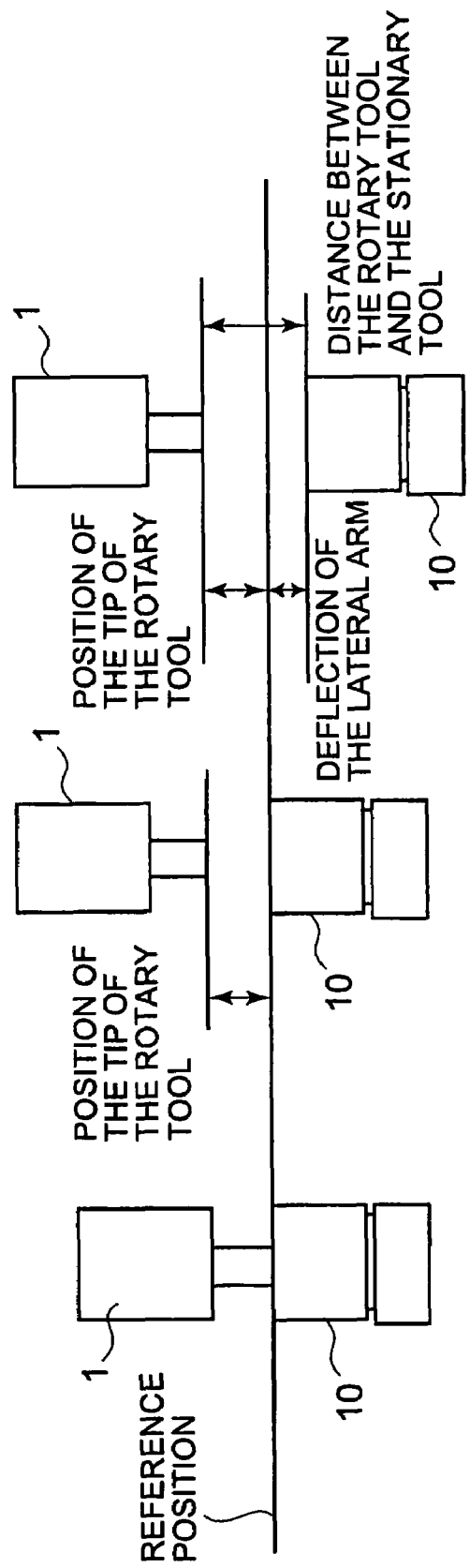
FIG. 5 is a view of assistance in explaining the relation between the position of the tip of a tool, tool-to-tool distance, and the deflection of a gun arm.

Referring to FIG. 5, the position of the tip of the projection 3 of the rotary tool (the feed) is calculated by comparing an output signal provided by the encoder combined with the feed motor in which the tip of the projection 3 of the rotary tool 1 is set at a reference position for confirming that the projection 3 is not broken, with an output signal provided by the same encoder in the present state where the rotary tool 1 is at a working position. A deflection correcting expression is produced on the basis of a table defining the relation between the pressure and the deflection of the lateral arm 56 of the bonding gun 50. A pressure for bonding is calculated by using the current fed back from the feed motor 52, and the deflection of the lateral arm 56 when the pressure is applied to the rotary tool 1 is calculated by using the deflection correcting expression and the pressure. Then, the distance between the rotary tool 1 and the fixed tool 10 is calculated on the basis of the relation between the deflection of the lateral arm 56 and the position of the tip of the projection 3 of the rotary tool 1.

The bonding control method may change the bonding time according to the load placed on the rotary tool 1.

This embodiment determines the condition of bond from the position of the tip of the rotary tool 1 and the load placed on the rotary tool 1, determines the optimum bonding conditions (pressure, rotating speed and bonding time) conforming to the condition of bond, and controlling the rotative drive motor 51 and the feed motor 52 on the basis of the optimum bonding conditions.

Thus, this embodiment can cause the plastic flow suitable for the materials and the thicknesses of the workpieces to be bonded together, reduces the possibility of faulty bonding and ensures stable bond quality A table of rotating speeds and reference currents respectively corresponding to the rotating speeds on the basis of the relation between a current fed back from the rotative drive motor 51 in an unloaded state and the rotating speed of the rotative drive motor 51 measured by the encoder, is prepared and a reference current calculating expression from the table is determined. Then Expression (1) defining the relation between the reference current calculated by using the reference current calculating expression, and the current fed back from the rotative drive motor during bonding, is calculated. Then the load placed on the rotary tool 1 is calculated by using Expression (1).

$$\text{(Load during bonding)}=\text{(Current fed back from the rotative drive motor)}-\text{(Reference current)} \quad (1)$$

Continuous Bonding

Although the foregoing embodiment has been described as applied to the lap-bonding of the workpieces W1 and W2 in which the rotary tool 1 is pressed against the joining parts of the workpieces W1 and 2 and is not moved relative to the workpieces W1 and W2, the foregoing embodiment may be applied to the continuous bonding of the workpieces W1 and W2 in which the rotary tool 1 is moved along the butting ends of the workpieces W1 and W2.

Figure 4:
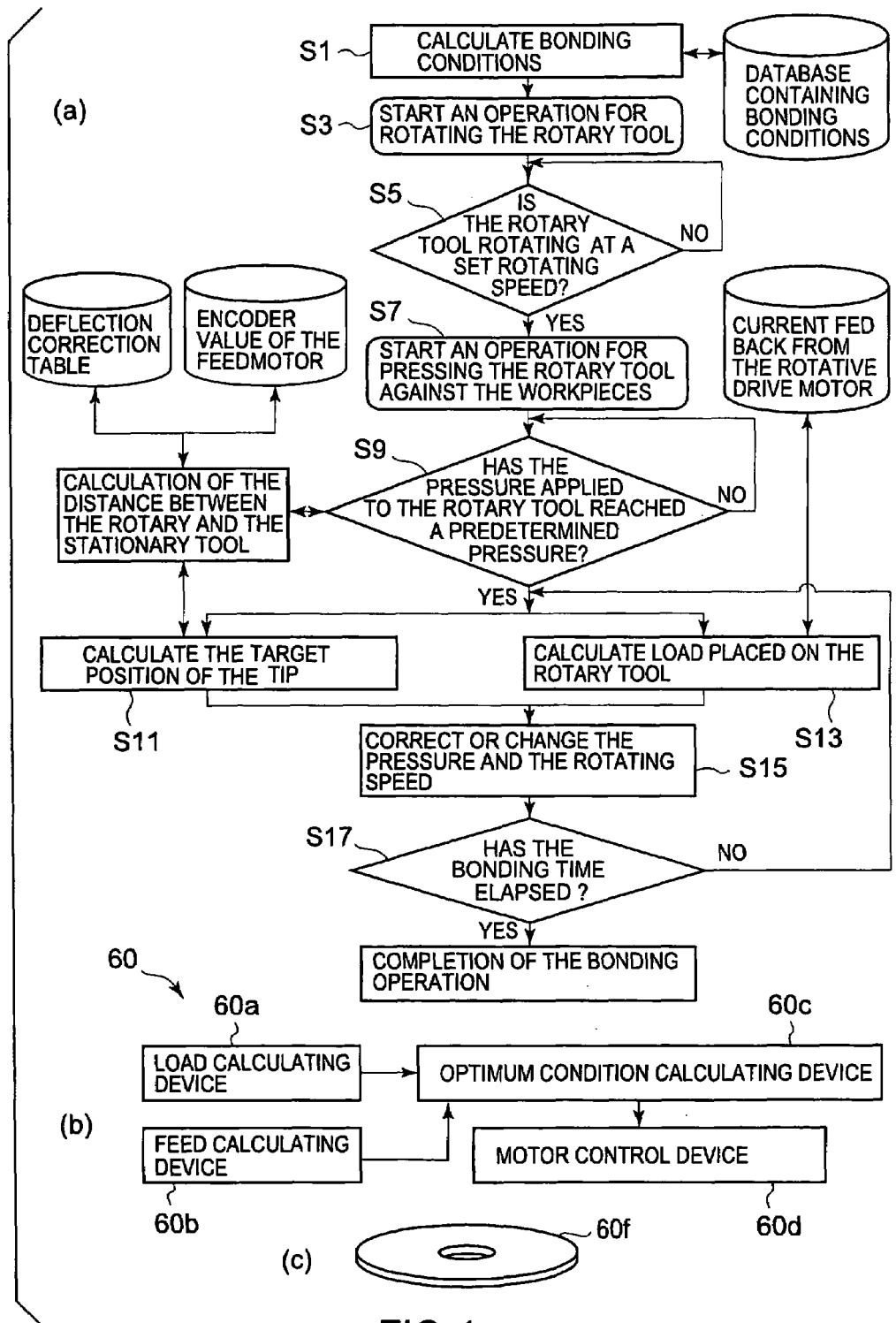
FIGS. 4(a), 4(b) and 4(c) are views of assistance in explaining a bonding control method of controlling frictional stirring bonding in a preferred embodiment according to the present invention.

An information storage medium 60f storing the computer program to be executed to carry out the bonding control method expressed by the flow chart shown in FIG. 4 and the program code may be loaded into the robot controller (computer) 60, and the computer may read the program code from the information storage medium 60f to carry out the process in the foregoing embodiment.

The invention claimed is:

1. A processing operation control method of controlling a processing operation of friction stir bonding for bonding workpieces using a rotary tool separated independently from the workpieces in which a rotary tool is rotated by a rotative drive unit, and the rotating rotary tool is pressed by a pressing unit to force the rotating rotary tool into the workpieces to process the workpieces, said processing operation control method comprising the steps of:

measuring load placed on the rotary tool during the processing operation;

determining an optimum rotating speed at which the rotary tool is to be rotated and an optimum pressure to be applied to the rotary tool for processing the workpieces on the basis of the measured load placed on the rotary tool; and controlling the rotative drive unit and the pressing unit, on the basis of the optimum rotating speed at which the rotary tool is to be rotated and the optimum pressure to be applied to the rotary tool, wherein an optimum processing time for which the rotary tool is to be operated for processing the workpieces is determined on the basis of the measured load placed on the rotary tool, and the rotative drive unit and the pressing unit are controlled according to the optimum processing time, wherein the rotative drive unit is a rotative drive motor, and the load placed on the rotary tool is determined on the basis of a current of the rotative drive motor, and wherein the optimum rotating speed at which the rotary tool is to be rotated and the optimum pressure to be applied to the rotary tool for processing the workpieces are determined on the basis of the depth of feed of the rotary tool in addition to the load placed on the rotary tool.

2. The processing operation control method according to claim 1, wherein the pressing unit is a pressing motor, and the depth of feed of the rotary tool is determined on the basis of a value indicating information about the pressing motor measured by an encoder.

3. The processing operation control method according to claim 1, wherein the measured load placed on the rotary tool is determined using a database containing empirical data and produced beforehand through experiments.

4. A processing operation controller for controlling a processing operation of friction stir bonding for bonding workpieces using a rotary tool separated independently from the workpieces in which a rotary tool is rotated by a rotative drive unit, and the rotating rotary tool is pressed by a pressing unit to force the rotating rotary tool into workpieces, to process the workpieces said processing operation controller comprising:

a load measuring means for measuring load placed on the rotary tool during the processing operation;

a speed/pressure determining means for determining an optimum rotating speed at which the rotary tool is to be rotated and an optimum pressure to be applied to the rotary tool for processing the workpieces on the basis of the load measured by the load measuring means; and a control means for controlling the rotative drive unit and the pressing unit on the basis of the optimum rotating speed at which the rotary tool is to be rotated and the optimum pressure to be applied to the rotary tool, wherein an optimum processing time for which the rotary tool is to be operated for processing the workpieces is determined on the basis of the measured load placed on the rotary tool, and the rotative drive unit and the pressing unit are controlled according to the optimum processing time, wherein the rotative drive unit is a rotative drive motor, and the load placed on the rotary tool is determined on the basis of a current of the rotative drive motor, and wherein the optimum rotating speed at which the rotary tool is to be rotated and the optimum pressure to be applied to the rotary tool for processing the workpieces are determined on the basis of the depth of feed of the rotary tool in addition to the load placed on the rotary tool.

5. The processing operation controller according to claim 4, wherein the pressing unit is a pressing motor, and the depth of feed of the rotary tool is determined on the basis of a value indicating information about the pressing motor measured by an encoder.

6. The processing operation controller to claim 4, wherein the basis of the measured load placed on the rotary tool is determined by using a database containing empirical data and produced beforehand through experiments.

7. A computer program for controlling a computer to accomplish a processing operation control method, of controlling a processing operation of friction stir bonding for bonding workpieces using a rotary tool separated independently from the workpieces in which a rotary tool is rotated by a rotative drive unit, and the rotating rotary tool is pressed by a pressing unit to force the rotating rotary tool into the workpieces to process the workpieces, comprising the steps of: measuring load placed on the rotary tool during the processing operation; determining an optimum rotating speed at which the rotary tool is to be rotated and an optimum pressure to be applied to the rotary tool for processing the workpieces on the basis of the measured load placed on the rotary tool; and controlling the rotative drive unit and the pressing unit, or both on the basis of the optimum rotating speed at which the rotary tool is to be rotated and the optimum pressure to be applied to the rotary tool, wherein an optimum processing time for which the rotary tool is to be operated for processing the workpieces is determined on the basis of the measured load placed on the rotary tool, and the rotative drive unit and the pressing unit are controlled according to the optimum processing time, wherein the rotative drive unit is a rotative drive motor, and the load placed on the rotary tool is determined on the basis of a current of the rotative drive motor, and wherein the optimum rotating speed at which the rotary tool is to be rotated and the optimum pressure to be applied to the rotary tool for processing the workpieces are determined on the basis of the depth of feed of the rotary tool in addition to the load placed on the rotary tool.

8. The computer program according to claim 7, wherein the pressing unit is a pressing motor, and the depth of feed of the rotary tool is determined on the basis of a value indicating information about the pressing motor measured by an encoder.

9. The computer program according to claim 7, wherein the optimum rotating speed at which the rotary tool is to be rotated and the optimum pressure to be applied to the rotary tool for processing the workpieces are determined on the basis of the measured load placed on the rotary tool, using a database containing empirical data and produced beforehand through experiments.

10. An information storage medium storing a program code for controlling a computer to accomplish a processing operation control method, of controlling a processing operation of friction stir bonding for bonding workpieces using a rotary tool separated independently from the workpieces in which a rotary tool is rotated by a rotative drive unit, and the rotating rotary tool is pressed by a pressing unit to force the rotating rotary tool into the workpieces to process the workpieces, comprising the steps of: measuring load placed on the rotary tool during the processing operation; determining an optimum rotating speed at which the rotary tool is to be rotated and an optimum pressure to be applied to the rotary tool for processing the workpieces on the basis of the measured load placed on the rotary tool; and controlling the rotative drive unit and the pressing unit, or both on the basis of the optimum rotating speed at which the rotary tool is to be rotated and the optimum pressure to be applied to the rotary tool, wherein an optimum processing time for which the rotary tool is to be operated for processing the workpieces is determined on the basis of the measured load placed on the rotary tool, and the rotative drive unit and the pressing unit are controlled according to the optimum processing time, wherein the rotative drive unit is a rotative drive motor, and the load placed on the rotary tool is determined on the basis of a current of the rotative drive motor, and wherein the optimum rotating speed at which the rotary tool is to be rotated and the optimum pressure to be applied to the rotary tool for processing the workpieces are determined on the basis of the depth of feed of the rotary tool in addition to the load placed on the rotary tool.

* * * * *